Patented Mar. 5, 1946

2,395,880

UNITED STATES PATENT OFFICE 2,395,880

CHEMICAL PROCESSES AND PRODUCTS

Joseph S. Kirk, Seven Hills Village, Ohio, assignor to E. I. du Pont de Nemours & Company, Wilmington, Del., a corporation of Delaware No Drawing. Application April 18, 1942,
Serial No. 439,549

8 Claims. (Cl. 260—462)

This invention relates to processes for esterfying polysilicic acids and to the esterified products, and is more particularly directed to processes in which esterifying agents and low molecular weight polysilicic acids are brought into contact in solution and water is removed, and is further directed to the esterified polysilicic acid products so produced.

It is an object of this invention to provide processes for directly esterifying polysilicic acids. A further object is to provide processes in which polysilicic acids are directly esterified to give novel products relatively stable against gellation during storage even when containing a relatively high proportion of combined silicon. Another object is to produce novel esterified polysilicic acid compositions having properties characteristic of a product having a nucleus of polysilicic acid with a predominance of ester groups on the exterior of the nucleus. Other objects will appear hereinafter.

The foregoing and other objects are accomplished according to this invention by bringing an esterifying agent and a polysilicic acid having a relatively low molecular weight into contact in solution and removing water, whereby there are produced esterified polysilicic acid compositions relatively stable against gellation. In a preferred embodiment of the invention the reaction solution contains more than about one per cent by weight of polysilicic acid expressed as $SiO_2$, the esterifying agent employed is monofunctional, and water is removed until the mol ratio of water to combined silicon, expressed as $SiO_2$, is not greater than 2:1. The steps of effecting contact between the reactants and of removing water may be carried out in any order; that is, uncombined water may be removed from the polysilicic acid solution before contacting it with the esterifying agent, or water may be removed from the solution after such contact, or a combination of these methods may be employed.

The compositions of this invention possess remarkable stability against rapid polymerization and gelling even when they contain relatively high proportions of combined silicon. Thus, these esterified polysilicic acid solutions are sufficiently stable to make practicable their use in technologies in which an appreciable period of time must elapse between the time of preparation and the time of use.

A polysilicic acid solution may be prepared for use in a process of this invention by a variety of methods, some of which are conventional in the art. Thus, a suitable solution of silicic acid may be obtained by the electrodialysis of an aqueous sodium silicate solution. Alternatively, silicon tetrachloride may be hydrolyzed in water. The electrodialysis method is well adapted to the production of silicic acid excellently suited for use in the process, but unfortunately is relatively slow and requires a considerable investment in manufacturing facilities per unit weight of silicic acid produced. The hydrolysis of silicon tetrachloride, on the other hand, proceeds rapidly but the silicon tetrachloride itself is relatively expensive, and hence the cost of the polysilicic acid produced is relatively high.

A preferred method for producing polysilicic acid for use in this invention is by acidifying a soluble silicate. A variety of silicates which are soluble in acid, such as sodium aluminum silicate, may be used, but ordinarily it is preferred to use sodium silicate because this material represents the ultimate in low-cost soluble silica.

It has been found that the manner of bringing sodium silicate into contact with acid is very important in producing a silicic acid solution of the desired kind. Thus, for best results it is necessary either that the sodium silicate be added to the acid or that the silicate and the acid be added simultaneously to a mixing zone and in either case that effective dispersion of the reactants at their point of contact be effected, and that the pH be maintained below about 3.0 and preferably below about 1.7. Effective dispersion of the reactants will be understood to mean that the reactants are brought together under conditions such that no substantial local concentration of one or the other is present at the point of mixing of thereafter. Ideally, the solution of silicic acid is maintained completely homogeneous at all times: this ideal is most closely approached by maintaining intense local agitation at the point of mixing as well as good general agitation of the silicic acid solution formed. In the preparation of the preferred compositions of this invention such effective agitation is provided.

The polysilicic acid used according to this invention may have a molecular weight ranging from that of disilicic acid up to that of silicic acid in a sol which is polymerized almost to the point of gelling. Preferably the polysilicic acid should have a relatively low molecular weight, but it is not necessary that the molecular weight should be so low as to be substantially dimeric. A solution prepared as above described will have a molecular weight in the desired range, but after their preparation such solutions have a tendency to undergo polymerization with an increase in molecular weight. To minimize this tendency any storage of the solution should be made at relatively low temperatures, say from 20 to 30° C., the storage period should not be prolonged, and the acidity of the solution should be in the pH range from about 1 to 3, preferably about 1.7.

In a particularly preferred embodiment of this invention the relative molecular weight of a polysilicic acid solution and, hence, its relative suitability, may be established according to an empirical test as follows:

A sample of the polysilicic acid solution to be tested is adjusted at the time of the test to a pH of 1.6 and a combined silicon content, expressed as $SiO_2$, of about 4.5% by weight. To a 10 cc. sample of this solution there is added 1 cc. of a solution having a pH of 2.5 and containing 50 grams of diethyl ether of diethylene glycol per 100 cc. of solution. To this mixture is added 5 cc. of a solution having a pH of 2.5 and containing 2% by weight of edible grade gelatine (such as Keystone #546). There is then added a measured volume of a solution having a pH of 2.5 and containing 300 gm. per liter of sodium chloride, this solution being run in from a burette with agitation, until the mixture becomes turbid with finely divided white precipitate. Then at once another 1 cc. of the solution of diethyl ether of diethylene glycol is added, which clears up the turbidity, and salt solution is further titrated into turbidity. Further 1 cc. quantities of the glycol solution are added and salt again added to turbidity.

The total concentrations of salt and of diethyl ether of diethylene glycol are now calculated in terms of grams per 100 cc. of mixture at each turbid-point, i. e., for each different amount of the glycol used. In calculating the total salt content of the mixture account must be taken of any salts already present in the sample. If, for example, sodium chloride is present it must be taken into account. If sodium sulfate is present, its equivalent of NaCl in salting-out power should be taken together with the NaCl in the titrating solution in calculating the total effective NaCl concentration in the system. To determine this equivalent, the titration can be carried out using $Na_2SO_4$ solutions of various concentrations instead of the standard salt solution until one is found which is equivalent in the titration to the standard NaCl solution. Thus, if 10 cc. of a solution of 210 grams per liter of a salt such as $Na_2SO_4$ (of the kind present in the sample of polysilicic acid solution) is found to be equivalent in this titration to 10 cc. of a solution of 280 grams per liter of NaCl, then for each gram of the salt (such as $Na_2SO_4$) present in the 10 cc. sample of the sol, the equivalent NaCl would be $$\frac{280}{210}$$

grams. This equivalent NaCl must be taken into account in calculating the total equivalent NaCl in the titration mixture at the point of turbidity.

Plotting these calculated values of per cent total equivalent NaCl against per cent of pure diethyl ether of diethylene glycol, a straight line is found. On extrapolating this line to the per cent diethyl ether of diethylene glycol axis, the intercept is found indicating the per cent of this ether at zero per cent NaCl at the point of turbidity.

As polysilicic acid solutions age or polymerize this intercept changes from about −6% to about +4%, the latter value being approached as the sol approaches the gel point, the change proceeding much more slowly as the value approaches +4%.

For esterification according to this invention it is preferred to use solutions which give a value of less than about +3%.

By the already described methods of preparation aqueous solutions of polysilicic acid having suitable low molecular weights readily may be obtained. In a process of this invention an esterifying agent may be added directly to such an aqueous solution of polysilicic acid and water may then be removed, or water may first be removed from the polysilicic acid solution and the esterifying agent added subsequently. When the latter procedure is followed, the polysilicic acid may be transferred into a non-aqueous solvent such as an organic liquid by various means.

A particularly advantageous method for effecting such transfer into the non-aqueous solvent is by salting out the polysilicic acid together with an organic hydrogen bonding donor compound preferably selected from the group consisting of ethers, amides, ketones, and alcohols. It will be understood that while such salted out solutions of polysilicic acid in hydrogen bonding donor compounds are predominantly non-aqueous, they may contain minor amounts of water. An organic hydrogen bonding donor compound suitable for use in such a salting out procedure may readily be selected by reference to the following considerations.

Hydrogen bonding is a concept advanced in recent years to explain certain abnormalities in the chemical and physical behavior of mixtures of compounds one of which, the acceptor, contains hydrogen attached to a strongly negative radical and the other, the donor, contains an atom capable of donating a pair of electrons to form a directional or coordination bond. This concept is well understood in the art, and its application to silicic acid is discussed in Kirk Patent 2,276,315.

When, for use in a process of this invention, polysilicic acid is transferred into solution in an organic hydrogen bonding donor compound by salting out, the donor compound used should be at least sparingly soluble in water and relatively insoluble in brine. Typical of suitable compositions are those shown in the following tabulations.

*Ethers*

Ethers are among the most effective of hydrogen bonding agents for extracting polysilicic acid from its aqueous solutions. Donors of this class in addition to containing an ether group may advantageously contain an oxygen atom in addition to that in the ether linkage and may contain, say, an additional ether group, a hydroxy group, an amide group, or an ester group. The presence of these groups appears very beneficial. A number of such groups may be present and there may be used, for instance, poly-ethers which contain hydroxyl groups and ester groups.

As examples of ethers the following are listed:

Dimethyl ether of tetraethylene glycol
Dimethyl ether of diethylene glycol
Butyl ether of diethylene glycol
Ethyl ether of diethylene glycol acetate
Methyl ether of diethylene glycol acetate
Monoethyl ether of diethylene glycol
Monoethyl ether of ethylene glycol
N,N′-bis(beta-methoxyethyl) adipamide
Polyethylene glycol adipate
Diethyl ether of diethylene glycol Dioxane
Dioxalane
Diethyl ether of ethylene glycol
Dimethyl ether of ethylene glycol
Triethylene glycol dipropionate
N,N'-dimethylmethoxyacetamide
N,N'-adipyldimorpholine
Dimorpholide urea
Polyethylene oxide The term "ether" will be understood to refer to organic compounds containing a carbon-oxygen-carbon ether group in which the carbon atoms attached to the oxygen are not directly attached to each other.

Polyethers obtained by the polymerization or interaction of ethylene oxide, propylene oxide, and the like with other organic substances are useful in modifying silicic acid by reason of ether groups which they contain. The following are examples of such reaction products:

Monomethyl ether of ethylene glycol-ethylene oxide reaction product
Ethanolformamide-ethylene oxide reaction product

Amides

Amides are among the preferred hydrogen bonding donors for extracting polysilicic acid from aqueous solutions. Whereas oxygen is the donor atom in ethers the nitrogen of amides probably acts as the donor atom. Among the most effective compounds of this group are the N-substituted amides and the di-substituted compounds are preferred.

Examples of amides are listed below, ureas and other amides being listed separately:

Ureas:
    Tetramethylurea
    Tetraethylurea

Amides:
    N,N,N',N'-tetramethyladipamide
    N,N-dimethylacetamide
    N,N,N',N'-tetramethylsuccinamide
    N,N,N',N'-tetraethylsuccinamide
    N,N-diethylacetamide
    N,N,N',N'-tetraethyloxamide
    N,N-diethylformamide
    N,N-diethylpropionamide
    N,N-diethylglycolamide
    N-isobutylacetamide
    N-formylhexamethylenimine
    Diethylcyanamide

Ketones

Ketones are among the effective hydrogen bonding agents for extracting polysilicic acid according to the present invention. Donors of this class in addition to containing a keto group may advantageously contain an oxygen in addition to that in the keto linkage or a nitrogen atom, and may contain, say, an ether group, an amide group, or an ester group. The presence of these groups appears very beneficial. A number of such groups may be present.

As examples of ketones, the following are listed:

Acetone
    Acetonyl acetone
    Formacetoethyl ketone
    Methyl acetoacetate
    Diacetone alcohol
    Diacetyl ketone

Alcohols

Alcohols are also among the preferred hydrogen bonding donors for extracting polysilicic acid from aqueous solutions. It will be understood, of course, that when alcohols are used they may serve the dual function of acting as solvents, and especially hydrogen bonding solvents, for the polysilicic acid and also of providing ester groups for reaction with silicic acid. The alcohols referred to in this tabulation are those effective as hydrogen bonding donor compounds for extracting the polysilicic acid from aqueous solutions, and this tabulation does not refer to the suitability or lack of suitability of the alcohols in providing ester groups for the esterification reaction. Preferably the alcohol used as a hydrogen bonding solvent should contain two or more carbon atoms and should have more than two carbon atoms per hydroxyl group.

Examples of alcohols which are effective are listed below:

Diacetone alcohol
    Ethanol
    N-propanol
    Isopropanol
    Tertiary amyl alcohol
    Tertiary butyl alcohol
    N-butanol When an organic hydrogen bonding donor compound is used as a solvent for polysilicic acid in a process of this invention, the polysilicic acid may be transferred from an aqueous solution into the donor compound by the technique of salting out; that is, by mixing the aqueous solution and donor compound and saturating or nearly saturating the water present with a salt. Salting out methods have previously been employed for such purposes as removing dyes from solutions during the course of their manufacture, and the art is familiar with the practice for such purposes. The salt employed should be chemically non-reactive with either the donor compound or the silicic acid. While a variety of salts may be used, such as potassium chloride, potassium sulfate, potassium bromide, calcium chloride, zinc chloride, magnesium sulfate, magnesium chloride, copper sulfate, ammonium chloride, ammonium sulfate, barium chloride, sodium nitrate, sodium sulfamate, ferrous sulfate, and ferric chloride, it is preferred to use sodium chloride or sodium sulfate because of their low cost and non-reactivity with silicic acid and hydrogen bonding donor compounds.

As already pointed out, the technique of salting out the polysilicic acid together with an organic hydrogen bonding donor compound provides one advantageous method for transferring polysilicic acid from an aqueous solution to a non-aqueous solution, or to a solution containing only a minor proportion of water. The polysilicic acid may be esterified by adding an esterifying agent to such non-aqueous solutions and removing water. It is observed that when the hydrogen bonding donor used according to the salting out method is an alcohol, the alcohol itself may serve as the esterifying agent in addition to serving as a solvent.

In a process of this invention polysilicic acid is treated with an esterifying agent, preferably of the mono-functional type, such as monohydric alcohol or an alcohol ester of a monohydric alcohol. The alcohol may be aliphatic, aromatic, hydroaromatic, araliphatic, or alicyclic; straight or branched chain; saturated or unsaturated;

primary, secondary, or tertiary; and may contain other functional groups than hydroxyl groups if desired, so long as the other functional groups do not interfere with the esterification reaction. Alternatively, an alcohol ester, which may hydrolyze to an alcohol, may be used.

The alcohol or ester employed may have any number of carbon atoms, but preferably it should be one which is soluble in the polysilicic acid solution which it is desired to esterify. Thus, as the esterifying agent there may be used primary alcohols such as methanol, ethanol, normal propyl alcohol, normal butyl alcohol, normal amyl alcohol, normal hexyl alcohol, normal octyl alcohol, normal decyl alcohol, or normal lauryl alcohol, or the branched chain analogues of these alcohols such as isopropyl alcohol, isobutyl alcohol, and isoamyl alcohol, or the secondary or tertiary analogues of these alcohols such as secondary and tertiary butyl alcohol, or the corresponding unsaturated alcohols. By the use of tertiary alcohols, especially interesting products may be produced.

After effecting contact of the esterifying agent and polysilicic acid in solution, water may be removed according to a process of this invention by any suitable method. Among such methods are (1) distillation, including distillation at subatmospheric pressure; (2) distillation of water as an azeotrope with excess of the esterifying agent or with an added liquid such as another alcohol, a hydrogen bonding donor compound, or a hydrocarbon such as benzene or toluene; (3) by the addition of a dehydrating agent such as anhydrous calcium sulfate; (4) separation of the water as a separate phase as in the salting out method above described where the hydrogen bonding donor solvent used is also an esterifying agent. When method (4) is employed, the polysilicic acid in the alcohol phase is already at least slightly esterified when the separation is made. When this method is used, however, it is preferred to effect further removal of water by other methods such as (1), (2), and (3) described above.

The polysilicic acid content, expressed as SiO$_2$, of the solution containing esterifying agent prior to removal of the water preferably should be greater than about 1% by weight, and excellent results are obtained when the polysilicic acid content is in the range from about 1 to 15% by weight.

In order to effect a substantial degree of esterification, the removal of water is continued until the mole ratio of water to combined silicon, expressed as SiO$_2$, in the solution is not greater than 2:1. In esterified polysilicic acid products of maximum stability this ratio may be considerably lower than 2:1.

The distillation methods for effecting water removal are particularly suitable because as the final step the original solvent for the polysilicic acid may be permitted to distill out leaving as the product the esterified polysilicic acid. For many purposes it may not be necessary or desirable that the esterified product be isolated from the solvent, but an exchange of solvents may be desired and this can readily be effected as a part of the distillation. Particularly useful products may, for instance, be produced by permitting a portion of the alcohol from which the ester groups are derived to remain in the final product. If desired, however, the product may be evaporated to dryness after esterification.

It is especially desirable that the removal of water be effected rapidly since from the time the polysilicic acid solution is prepared until it is at least partially esterified polymerization tends to occur, and unless water removal is effected promptly, the polymerization may proceed to the point where the product gels.

The removal of water from polysilicic acid solution in contact with esterifying agents according to this invention preferably is carried out under acidic conditions. By "acidic" is meant that there is present a medium of such acid character as to be equivalent to a solution of pH less than 7. So long as water is present the pH may, of course, be determined directly, but it will be understood that when solvents other than water are used for the polysilicic acid, acidic conditions may be present by reason of the acid character of the polysilicic acid or of the solvent even though a direct determination of pH may not be possible. Particularly satisfactory results are obtained using conditions such that the acidity is equivalent to a pH of about from 1 to 3 and more particularly of about 1.6. Under these conditions of pH the polymerization of polysilicic acid does not take place to any undesirable extent during the water removal.

The compositions of this invention may be characterized as esterified polysilicic acids. The degree of polymerization of the polysilicic acid lies between that existing in disilicic acid and that present in a polysilicic acid sol which is polymerized almost to the point of gellation. The degree of polymerization is usually greater than that in the dimer and yet considerably less than that in a gel.

The stability of the compositions of this invention upon storage and other of their properties indicates that the products have a nucleus of polysilicic acid with a predominance of ester groups present on the exterior of the nucleus. Since they are directly prepared by esterifying polysilicic acid, the esterification tends to take place upon the surface of the molecule. By reason of steric hindrance and to the extent that such surface esterification takes place the proportion of hydroxyl groups remaining on the surface of the polysilicic acid is correspondingly reduced. Polymerization of polysilicic acid is believed to take place by the splitting out of water between two hydroxyl groups attached to adjacent silicon atoms into the formation of an oxygen bridge, and when such hydroxyl groups on the surface are decreased in number, the opportunity for such polymerization is reduced. Such an explanation may account for the stability and other unusual properties of compositions of this invention, but it will be understood that there may be other explanations also and that the explanation given does not limit the invention.

The compositions of this invention exhibit many properties characteristic of colloidal solutions, and such properties may be explained on the basis that the polysilicic acid exists in the form of a nucleus or micelle. The presence of esterified groups on such micelles imparts to them properties not characteristic of ordinary polysilicic acid micelles. Again, while the characterization of the products as micelles or esterified micelles helps to explain their unique character, the invention is not bound to this explanation.

Preferred products of this invention may have ratios of ester groups to silicon atoms of from about 1:20 to about 2:1. These ratios of ester groups to silicon atoms will be recognized as being considerably lower than similar ratios of the silicic acid orthoesters heretofore available. On the other hand, despite their relatively low ester group content the products of this invention are relatively stable upon storage even over prolonged periods. The more highly esterified compositions are soluble in hydrocarbon solvents such as benzene.

The nature of the novel processes and compositions of this invention will be better understood from a consideration of the following illustrative examples.

Example I

An aqueous polysilicic acid solution containing 12% by weight of silicic acid expressed as $SiO_2$ was prepared by adding sodium silicate solution to dilute sulfuric acid with effective agitation, the pH of the final solution being 1.8. To 210 parts by weight of this solution there was immediately added 800 parts by weight of n-propanol and 240 parts of ethanol and the mixture was stirred thoroughly. A precipitate of hydrated sodium sulfate was formed and filtered off.

Removal of water from this polysilicic acid solution in the presence of the alcohol already present was carried out under acidic conditions by placing 1186 parts by weight of the filtered solution into a vacuum still and subjecting it to distillation under a pressure of from about 25 to 40 mm. of mercury, absolute, and a temperature, measured in the vapor, of from about 27 to 32° C. This distillation was continued until the temperature reached and remained at the boiling point of n-propanol at the pressure employed. Prior to this point, the distillate contained an azeotrope of ethanol, n-propanol, and water, but when this point was reached the distillate consisted of n-propanol.

There was obtained as a product 182 parts by weight of a solution of esterified polysilicic acid in residual n-propanol. The ester groups were predominantly propyl groups. The product contained combined silicon equivalent to 14% $SiO_2$. The product was a highly fluid liquid which showed no tendency to gel even after two months storage. The n-propanol solution was miscible in hydrocarbon solvents such as benzene and retained its solubility after the two month storage period.

The use of a salting out technique for removing water in a process of this invention is illustrated in Example II.

Example II

A solution of sodium silicate was made by diluting 100.8 parts by weight of a sodium silicate solution having a 1.9 weight ratio of $SiO_2$ to $Na_2O$ to 400 parts by weight with water. Dilute muriatic acid solution was made by diluting to 400 parts by weight 201.6 parts of a commercial 22° Bé. solution. A silicic acid solution was made by adding one part by weight of the acid solution 3.15 parts by weight of the silicate solution with effective agitation at the point of contact of the solutions and throughout the batch. The polysilicic acid soluion thus obtained had a pH of 1.7, contained silicic acid equivalent to 6% $SiO_2$ and sodium chloride equivalent to 7.2% by weight. The solution was essentially water-thin and showed no evidence of gelling. The fluorine content was less than 20 ppm.

To the 4.15 parts by weight of polysilicic acid solution thus obtained there was immediately added 1.04 parts by weight of tertiary butyl alcohol with efficient mixing. There was then added 1.3 parts by weight of sodium chloride which was approximately the amount required to saturate the water present with salt. After thorough mixing the solution was allowed to stand and there separated out as an upper layer a liquid constituting about .7 part by weight or 11% of the total. This layer was decanted off and found to contain about 4% by weight of silicon expressed as $SiO_2$, 12% of water, and 84% of tertiary butyl alcohol.

From this tertiary butyl alcohol solution additional water could have been removed but since the n-butanol ester was desired rather than the tertiary butyl alcohol ester, there was added to the .7 part by weight of the tertiary butyl alcohol solution .7 part by weight of n-butanol. The solution thus obtained was placed in a vacuum still and distilled under 40 mm. pressure absolute at 30 to 50° C. At 30° a water-tertiary butyl alcohol azeotrope was distilled over, at a slightly higher temperature tertiary butyl alcohol was distilled off and at 50° C. n-butanol started to distill off. Ten per cent or .14 part by weight of the original charge remained as a residue in the still. This residue was an esterified polysilicic acid product dissolved in n-butanol. Silicon was present equivalent to 20% by weight expressed as $SiO_2$, the balance being substantially n-butanol with a trace of salt present.

The product obtained was stable upon storage despite its high silica content; it remained soluble in hydrocarbons even after an extended storage period; it was non-volatile; and it possessed characteristics such as would be exhibited by a product having a nucleus of polysilicic acid with a predominance of ester groups present on the exterior of the molecule.

Example III

This example illustrates the esterification of polysilicic acid with a tertiary alcohol. It illustrates removal of water, first by saturating the reaction mixture with salt and then by azeotropic distillation under reduced pressure.

An aqueous solution of relatively low molecular weight polysilicic acid is prepared by adding 900 g. of a 15.5% solution of sodium silicate ($SiO_2$:$Na_2O$=3.25:1 by weight) to 860 g. of a vigorously stirred solution of 7% sulfuric acid over a period of 10 minutes. To the resulting solution (pH 1.8) 200 g. of tertiary butanol and 450 g. of salt are added at once, and stirring is continued for about 5 minutes or until the salt is dissolved. The upper, tertiary butanol layer which separates when the mixture is allowed to stand for 45 minutes is separated from the aqueous layer and dried for 30 minutes over anhydrous sodium sulfate. The resulting clear tertiary butanol solution of tertiary butyl acid polysilicate weighs 132 g. Its concentration on an $SiO_2$ basis is 12% by weight. The degree of esterification or ratio of silicic acid ester groups to silicon atoms in the product, calculated from the composition (83.4% $SiO_2$, 4.32% C) of the residue obtained by evaporating a thin film of the solution to dryness at room temperature, first in a current of dry air and finally at a pressure of 1–2 mm. of mercury over phosphorus pentoxide, is 1:16.

The degree of esterification is increased by azeotropic distillation of water from the solution, first with tertiary butanol at a pressure of 75 mm. of mercury and then with benzene at a pressure of 130 mm. of mercury. During the distillation the solution is not heated above 35° C., and tertiary butanol is added to maintain approximately the original ratio of tertiary butanol to $SiO_2$. Distillation is continued until the distillate obtained contains only traces of water. The benzene is finally completely removed by distillation. The solution obtained, clarified by filtration, contains 10.3% $SiO_2$ in the form of tertiary butyl acid polysilicate in which the ratio of silicic acid ester groups to silicon atoms, determined as described above, is 1:5.4. The final product is much more stable toward gellation than is the intermediate product in which the degree of esterification of the polysilicic acid is relatively low.

*Example IV*

This example illustrates the esterification of polysilicic acid with a primary alcohol formed by partial hydrolysis of a trialkyl phosphate.

To 1760 g. of an aqueous solution of relatively low molecular weight polysilicic acid prepared as described in Example III are added 196 g. of tributyl phosphate and 460 g. of sodium chloride. The mixture is stirred for 1 hour and then is allowed to stand for 1 hour. The upper, tributyl phosphate layer is separated and dried over anhydrous sodium sulfate. The yield of clear, tributyl phosphate solution of butyl acid polysilicate is 125 g. The degree of esterification of the polysilicic acid in the solution, calculated from analytical data ($SiO_2$, 16.5%; C, 43.9%; and P, 8.9%) is 1:5.4 expressed as ratio of silicic acid ester groups to silicon atoms. The product contains only 3.4% water and does not gel on standing at room temperature for more than a year. Addition of hydrocarbon solvents such as benzene and toluene cause precipitation of the polysilicic acid esters in which the degree of esterification is relatively low.

*Example V*

This example illustrates the use of azeotropic distillation at atmospheric pressure to remove water from a n-butanol solution of butyl acid polysilicate, and the preparation of a polysilicic acid ester in which the degree of esterification is relatively high.

A predominantly n-butanol solution of polysilicic acid esterified to a slight degree with n-butanol is prepared from a tributyl phosphate solution of butyl acid polysilicate as follows. One volume of a tributyl phosphate solution prepared as described in Example IV is diluted with one volume of methanol, and 2.5 volumes of benzene is added rapidly with stirring. The methanol solution of partially esterified polysilicic acid which separates as a lower layer when the mixture is allowed to stand for 15 minutes contains 50 to 60% $SiO_2$. It is separated and dissolved in sufficient n-butanol to lower the $SiO_2$ concentration to 8.4% by weight. The resulting solution contains 0.8% water.

To 214 parts by weight of the n-butanol solution prepared in the above manner an additional 81 parts of n-butanol is added. A mixture of water and n-butanol is then distilled at atmospheric pressure from the solution over a period of 48 hours. The original volume of the n-butyl acid polysilicate solution is maintained during the distillation by further additions of n-butanol. The last portion of distillate contains only traces of water. The product, an n-butanol solution of n-butyl acid polysilicate, is concentrated to 22.7% $SiO_2$ by further distillation. The resulting solution immediately after preparation contains essentially no water. The solid n-butyl acid polysilicate obtained by removal of the solvent at room temperature under anhydrous conditions contains 55.4% $SiO_2$ and 31.8% C. This corresponds to a ratio of silicic acid ester groups to silicon atoms of 1:1.4. The solid ester can be redissolved in common organic solvents including alcohol, acetone, benzene, and a high solvency petroleum hydrocarbon (B. P. 155–210° C.).

A solution of the n-butyl acid polysilicate in high solvency petroleum hydrocarbon (B. P. 155–210° C.) is alternatively prepared by adding 34 parts of the hydrocarbon solvent to 39 parts of the n-butanol solution of n-butyl acid polysilicate containing 22.7% $SiO_2$ and removing the n-butanol by distillation. The resulting 40 parts of petroleum hydrocarbon solution contains 19% $SiO_2$ in the form of n-butyl acid polysilicate.

*Example VI*

This example illustrates the preparation of an organic solvent soluble cycloaliphatic ester of polysilicic acid.

Methanol and some water are removed by distillation from 100 parts of a n-butanol solution of n-butyl acid polysilicate prepared by dissolving the concentrated methanol solution of partially esterified polysilicic acid described in Example V in sufficient n-butanol to lower the $SiO_2$ concentration to 8.47%. An additional 37 parts of n-butanol and 5.6 parts of cyclohexanol are added. Distillation is continued until 40 parts of n-butanol is removed. Then 30 parts of a high solvency petroleum hydrocarbon (B. P. 155–210° C.) is added and the n-butanol is completely removed by distillation, first at atmospheric pressure and finally at a pressure of 70 mm. of mercury. The resulting hydrocarbon solution contains 21% $SiO_2$ in the form of cyclohexyl acid polysilicate. It is substantially free of water.

*Example VII*

This example illustrates the preparation of an organic solvent soluble long chain ester of polysilicic acid.

Methanol and some water are removed by distillation from 387 parts of a n-butanol solution of n-butyl acid polysilicate prepared by dissolving the concentrated methanol solution of partially esterified polysilicic acid described in Example V in sufficient n-butanol to lower the $SiO_2$ concentration to 9.6%. Then 26.8 g. of n-octanol and 121 parts of a high solvency petroleum hydrocarbon (B. P. 155–210° C.) are added and the n-butanol is completely removed by distillation, first at atmospheric pressure and finally at a pressure of 80 mm. of mercury. The resulting hydrocarbon solution contains 29% $SiO_2$ in the form of n-octyl acid polysilicate. It is substantially free of water.

The compositions of this invention are useful for a variety of purposes such as in adhesives for oxygen-containing polymers, and as modifying agents for alkyd resins.

While in the foregoing description of this invention there have been shown certain specific processes and certain products, it will be understood that without departing from the spirit of the invention one skilled in the art may readily employ numerous processes and produce numerous products.

I claim:

1. In a process for producing partially esterified polysilicic acid liquid compositions characterized by having a ratio of ester groups to silicon atoms of about from 1:20 to 2:1 and having greater stability against gelling than the unesterified polysilicic acids from which they are produced, the steps comprising mixing a monohydric alcohol and a solution of a low molecular weight polysilicic acid, the solution having a polysilicic acid content greater than one per cent, expressed as $SiO_2$, and removing water from the mixture of alcohol and acid while maintaining the acidity equivalent to a pH of about from 1 to 3.

2. In a process for producing partially esterified polysilicic acid liquid compositions characterized by having a ratio of ester groups to silicon atoms of about from 1:20 to 2:1 and having greater stability against gelling than the unesterified polysilicic acids from which they are produced, the steps comprising mixing a monohydric alcohol and a solution of a low molecular weight polysilicic acid, the solution having a polysilicic acid content greater than one per cent, expressed as $SiO_2$, and removing water from the mixture of alcohol and acid, while maintaining the acidity equivalent to a pH of about from 1 to 3, until the mole ratio of water to combined silicon, expressed as $SiO_2$, is not greater than 2:1.

3. In a process for producing partially esterified polysilicic acid liquid compositions characterized by having a ratio of ester groups to silicon atoms of about from 1:20 to 2:1 and having greater stability against gelling than the unesterified polysilicic acids from which they are produced, the steps comprising preparing an aqueous, low molecular weight polysilicic acid solution, salting out a solution of the polysilicic acid in an organic hydrogen bonding donor solvent as a separate phase, the phase containing more than one per cent of polysilicic acid expressed as $SiO_2$, mixing a monohydric alcohol with the salted-out phase, and removing water from the mixture of alcohol and acid while maintaining the acidity equivalent to a pH of about from 1 to 3.

4. In a process for producing partially esterified polysilicic acid liquid compositions characterized by having a ratio of ester groups to silicon atoms of about from 1:20 to 2:1 and having greater stability against gelling than the unesterified polysilicic acids from which they are produced, the steps comprising preparing an aqueous, low molecular weight polysilicic acid solution, salting out a solution of the polysilicic acid in an organic hydrogen bonding donor solvent as a separate phase, the phase containing more than one per cent of polysilicic acid expressed as $SiO_2$, mixing a monohydric alcohol with the salted-out phase, and removing water from the mixture of alcohol and acid, while maintaining the acidity equivalent to a pH of about from 1 to 3, until the mole ratio of water to combined silicon, expressed as $SiO_2$, is not greater than 2:1.

5. In a process for producing partially esterified polysilicic acid liquid compositions characterized by having a ratio of ester groups to silicon atoms of about from 1:20 to 2:1 and having greater stability against gelling than the unesterified polysilicic acids from which they are produced, the steps comprising preparing an aqueous, low molecular weight polysilicic acid solution, salting out a solution of the polysilicic acid in an organic hydrogen bonding donor solvent selected from the group consisting of ethers, amides, ketones, and alcohols, as a separate phase, the phase containing more than one per cent of polysilicic acid expressed as $SiO_2$, mixing a monohydric alcohol with the salted-out phase, and removing water from the mixture of alcohol and acid, while maintaining the acidity equivalent to a pH of about from 1 to 3.

6. In a process for producing partially esterified polysilicic acid liquid compositions characterized by having a ratio of ester groups to silicon atoms of about from 1:20 to 2:1 and having greater stability against gelling than the unesterified polysilicic acids from which they are produced, the steps comprising mixing a monohydric alcohol and a solution of a low molecular weight polysilicic acid, the solution having a polysilicic acid content greater than one per cent, expressed as $SiO_2$, and removing water from the mixture of alcohol and acid by distillation while maintaining the acidity equivalent to a pH of about from 1 to 3.

7. A liquid composition comprising a polysilicic acid partially esterified with a monohydric alcohol, characterized by having a ratio of ester groups to silicon atoms of about from 1:20 to 2:1 and by having greater stability against gelling than the polysilicic acid from which the composition was produced.

8. A liquid composition comprising a polysilicic acid partially esterified with a monohydric alcohol, characterized by having a ratio of ester groups to silicon atoms of about from 1:20 to 2:1, by having greater stability against gelling than the polysilicic acid from which the composition was produced, and by having an uncombined water content such that the mole ratio of water to combined silicon, expressed as $SiO_2$, is not greater than 2:1.

JOSEPH S. KIRK.